United States Patent [19]

Herrington et al.

[11] 4,177,136

[45] Dec. 4, 1979

[54] HYDROTREATING PROCESS UTILIZING ELEMENTAL SULFUR FOR PRESULFIDING THE CATALYST

[75] Inventors: Daniel R. Herrington, Chesterland; Albert P. Schwerko, Solon, both of Ohio

[73] Assignee: The Standard Oil Company (Ohio), Cleveland, Ohio

[21] Appl. No.: 905,322

[22] Filed: May 12, 1978

Related U.S. Application Data

[62] Division of Ser. No. 866,208, Jan. 3, 1978.

[51] Int. Cl.² ............................................. C10G 23/02
[52] U.S. Cl. ............................... 208/215; 208/216 R; 208/216 PP; 208/217; 208/254 H
[58] Field of Search ............ 208/216 R, 216 PP, 217, 208/254 H, 215, 213; 252/439

[56] References Cited

U.S. PATENT DOCUMENTS

| | | | |
|---|---|---|---|
| 2,038,599 | 4/1936 | Pier et al. | 252/439 |
| 2,905,625 | 9/1959 | Berger | 208/254 H |

FOREIGN PATENT DOCUMENTS

759938  5/1967  Canada .................................... 252/439

*Primary Examiner*—George J. Crasanakis
*Attorney, Agent, or Firm*—David J. Untener; Herbert D. Knudsen; Larry W. Evans

[57] ABSTRACT

The present invention relates to an improved method of catalyst presulfiding, wherein the catalyst is treated with elemental sulfur. The use of elemental sulfur as a catalyst presulfiding agent is a means of rapidly and reproducibly attaining a highly active catalyst.

6 Claims, 1 Drawing Figure

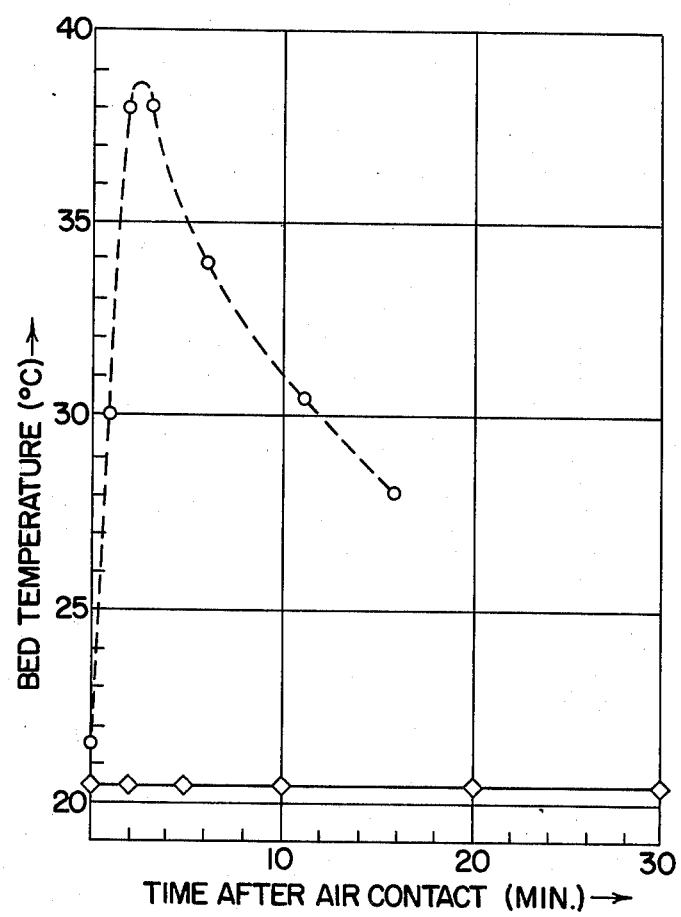

HYDROTREATING PROCESS UTILIZING ELEMENTAL SULFUR FOR PRESULFIDING THE CATALYST

This is a division of application Ser. No. 866,208 filed Jan. 3, 1978.

BACKGROUND OF THE INVENTION

The hydrotreating of hydrocarbon feed stocks containing carbon-sulfur bonds, carbon-nitrogen bonds and/or carbon-oxygen bonds is well known in the art. See for example, G. C. A. Schuit and B. C. Gates, *A.I.Ch.E.J.* 19(3), 419 (1973); S. C. Schuman and H. Shalit, Catalyst Review 4(2), 245 (1970).

Impregnation techniques for molten sulfur are known in other areas of technology, such as impregnation of ceramic bathroom tile and corrugated cardboard. See *A.C.S. Adv. Chem. Ser.* (110), 212-217 (1972).

West German Pat. No. 1,113,446 to BASF discloses the utilization of elemental sulfur and hydrogen to pretreat an alumina-supported cobalt molybdate catalyst which is employed in $H_2S$ synthesis.

U.S. Pat. No. 3,424,782 to Nippon Oil shows the treatment of an ammoxidation catalyst with elemental sulfur and hydrogen to enhance the selectivity, but sulfur is continually added to the feed.

U.S. Pat. No. 3,563,912 to Union Oil discloses a method of preparing a nonpyrophoric sulfided catalyst for safe shipping and handling, wherein the partially sulfided catalyst is coated with paraffin or another sealant, the sealant containing encapsulated sulfur or a sulfur-containing compound.

U.S. Pat. No. 3,453,217 to Chevron discloses a sulfided catalyst which is coated with a hydrocarbon to protect it from the atmosphere. More than 5 wt. % of the metal sulfides are converted to other compounds in this process.

U.S. Pat. No. 4,014,815 to Exxon discloses a process for regenerating spent metal catalysts by treatment with a sulfurous atmosphere at a pressure of at least 0.10 atmospheres and at a controlled high temperature of between 400°-825° C., preferably between 400°-715° C., and most preferably between 400°-600° C., for a time sufficient for the selective formation of sulfides of carbon and sulfides of vanadium or lead which sulfides are characterized by having high volatility and solubility in the sulfurous atmosphere and which vanadium and carbon sulfides are selectively removed from the catalyst within the stated temperature range.

U.S. Pat. No. 4,048,058 to Standard Oil (Indiana) discloses that multimetallic reforming catalysts are sulfided at 350°-470° C. in a stream of light hydrocarbons, rich in hydrogen, by injecting sulfur compound into the stream, upstream from the catalyst, and continuing the treatment to provide on the catalyst 0.1 to 2.5 moles sulfur/mole total active metal.

SUMMARY OF THE INVENTION

It has been discovered by the process of the present invention a process for sulfiding an at least partially porous metal oxide catalyst, the improvement of:
 (a) contacting said metal oxide catalyst with elemental sulfur in such a manner that said elemental sulfur is at least partially incorporated in the pores of said metal oxide catalyst; and
 (b) contacting the metal oxide catalyst, which has sulfur at least partially incorporated in the pores of said metal oxide catalyst, with hydrogen at temperatures of 200° C. to 600° C.

The most significant aspect of the present invention is that improved results are obtained when catalyst presulfiding is accomplished using elemental sulfur as the sulfiding agent and hydrogen as the reducing agent to convert the elemental sulfur to $H_2S$ in situ. The use of elemental sulfur as a presulfiding agent is more efficient and economical than sulfur containing compounds since elemental sulfur is 100% sulfur and generates 8 moles of $H_2S$ per mole sulfur, as compared to use of dimethyl sulfide which contains 51 weight % sulfur and 1 mole $H_2S$ per mole $(CH_3)_2S$, dimethyl disulfide, which contains 68 weight % sulfur and 2 moles $H_2S$ per mole $(CH_3)_2S_2$ or carbon disulfide, which contains 85 weight % sulfur and 2 moles $H_2S$ per mole $CS_2$. Dimethyl disulfide or dimethyl sulfide are commonly used as dilute solutions in hexane or heptane. The large volumes of these solvents that are utilized are unnecessarily wasted. By the process of the present invention a very rapid and reproducible attainment of a highly active form of hydrotreating catalyst is obtained as compared with prior art techniques, which use $H_2S$ treatments. Heretofore, moderately active catalysts required long pretreatments to achieve the peak of their activity. Second, aged catalysts which have been regenerated and must be resulfided may also be reactivated more rapid with elemental sulfur compared with use of hydrogen sulfide. The process of the present invention is generally applicable to any catalyst which must be used in the sulfided form. However, the process of the present invention is especially effective in the presulfiding of hydrotreating catalysts.

Sulfur may be economically obtained from refinery streams, since most refineries have Claus units to produce by-product sulfur from sour tail gases. Use of solid sulfur eliminates many of the hazards, such as flammability and toxicity, encountered using $H_2S$ or liquid sulfides.

Several techniques may be employed to contact sulfur with the catalyst articles. For example, powdered sulfur may be physically mixed with the catalyst particles prior to charging the catalyst particles to the reactor. Alternately, each bed of catalyst particles in the reactor may be topped by a layer of elemental sulfur in quantities sufficient to sulfide catalyst in said bed. By the preferred procedure of the invention, a portion of the catalyst particles is contacted with molten sulfur at approximately 100°-150° C., preferably 110°-130° C., external to the reactor until the liquid sulfur has been incorporated within the pores of the catalyst particles. The catalyst is cooled to allow the sulfur to solidify within the particles, and the resulting product is employed as the top portion of each catalyst bed. In this manner, preferably a stoichiometric amount of sulfur, approximately 12% by weight of the catalyst charged, is employed. However, this number may vary depending upon the metal content of the catalyst and its total pore volume. In accordance with the present invention, the sulfiding process is completed by contacting the catalyst particles with hydrogen at temperatures ranging from 200° C. to 600° C., preferably at temperatures of 300° C. to 470° C., under ambient pressure. Superior results are achieved if sulfided catalysts contain at least one of vanadium, chromium, manganese, iron, cobalt, nickel, copper, zinc, molybdenum, tungsten, rhodium, palladium, platinum, silver, gold, cadmium, aluminum, tin, antimony, bismuth and tellurium. Hydrogen gas may be introduced into the reactor prior to heating. The hydrogen treatment is continued until the sulfur has been slowly reacted. By the process of the present invention, no separate pre-reduction step or high pressure operation is required.

Although it would be convenient for catalyst manufacturers to supply hydrotreating catalysts to refiners in a sulfided form, most sulfided hydrotreating catalysts are pyrophoric. Some attempts have been made to circumvent this problem, such as coating the catalyst with wax to protect the catalyst from air, but this process is not economical. The process of the present invention provides a sulfur-containing catalyst which is completely non-pyrophoric.

The process of the present invention is further applicable to the sulfiding of aged catalysts which have been regenerated. In refinery operations, rather than discarding a portion of the catalyst after regeneration and replacing it with fresh catalyst, within the scope of the present invention, this portion of the catalyst may be replaced with catalyst containing sufficient solid sulfur in its pore structure to resulfide the entire catalyst bed. Once the replacement charge is loaded to the reactor, the sulfiding is completed by introducing hydrogen at temperatures indicated above. A refinery which employs a Claus unit may store the sulfur in a molten sulfur pit, and the molten sulfur is a ready source for the catalyst impregnation. Using the procedure of the present invention, the refiner may pretreat enough catalysts to sulfide not only the initial charge of catalysts, but also subsequent regenerated catalyst beds.

SPECIFIC EMBODIMENTS

Comparative Examples A to D and Examples 1 to 5

In an HDS microreactor, various comparative tests were conducted on the hydrodesulfurization of thiophene at ambient pressure. Hydrogen was saturated with thiophene and passed through the reaction zone containing the various catalysts. The Tables below show the results of these tests. The results are shown in terms of the amount of thiophene desulfurized.

The thiophene-hydrogen mixture was fed through the reaction zone over the range of temperatures and liquid hourly space velocity (LHSV) as shown in the Tables. The results are shown in terms of the amount of thiophene desulfurized. The results were obtained by analyzing measured samples of reactor feed and effluent by gas-liquid chromatography.

Comparative Example A and Example 1—Performance of Catalyst Bed Topped with a Layer of Powdered Sulfur Compared with Performance of Catalyst Bed Presulfided with 95% $H_2$/5% $H_2S$ at 371° C. and Ambient Pressure 5 g. of a conventional cobalt molybdate catalyst containing 3 weight % CoO and 15 weight % $MoO_3$, having a pore volume of 0.5 $cm^3$/g., ground and screened to 12×20 mesh size, was placed in a tube and topped with a layer of 0.4 g. of powdered sulfur. After flushing with nitrogen, hydrogen flow was begun and the sample was heated to 371° C. and held at this temperature for one hour. The catalyst was reacted with thiophene in an HDS microreactor. The activity of a second catalyst, which was treated with 95% $H_2$/5% $H_2S$ stream at 371° C. for one hour was determined. The results of these experiments appear in Table I.

TABLE I

| Example | % Thiophene Conversion at 371° C. and Ambient Pressure | | |
|---|---|---|---|
| | LHSV, $hr^{-1}$ = 0.25 | LHSV, $hr^{-1}$ = 0.50 | LHSV, $hr^{-1}$ = 1.0 |
| Comp. A | 57.7 | 37.2 | 23.0 |
| 1 | 61.5 | 47.3 | 31.0 |

Example 2 and Comparative Example B—Performance of Catalyst Bed Topped with a Layer of Catalyst containing Molten Sulfur in the Pores and Heat Treated with Hydrogen Compared with Use of $H_2S$ A 5 gram portion of the catalyst described in Example 1 was placed in a tube and topped with a layer of 0.4 g of powdered sulfur. The tube and its content were heated at 120° C. for approximately 30 minutes during which time the sulfur melted and was absorbed in the pores of the top portion of catalyst. The sample was cooled to room temperature to allow the sulfur to solidify. The entire sample was purged with a nitrogen stream and heated under a hydrogen stream at 371° C. for approximately 1 hour. The catalytic activity was determined in an HDS microreactor. A portion of the catalyst prepared in Comparative Example A was reacted in the same manner described above. The experimental results appear in Table II.

TABLE II

| Example | % Thiophene Conversion at 371° C. and Ambient Pressure | | |
|---|---|---|---|
| | LHSV, $hr^{-1}$ = 0.25 | LHSV, $hr^{-1}$ = 0.50 | LHSV, $hr^{-1}$ = 1.0 |
| Comp. B | 57.7 | 37.2 | 23.0 |
| 2 | 66.0 | 48.7 | 30.8 |

Comparative Example C and Example 3—Performance of an Aged Catalyst from a Refining Resulfided with Elemental Sulfur and Hydrogen A 5 g. portion of a commercial nickel molybdate hydrotreating catalyst having a pore volume of 0.5 $cm^3$/g., ground and screened to 12×20 mesh size, was placed in a tube and topped with a layer of 0.8 g. of powdered sulfur. (This catalyst was regenerated and removed from a refinery-hydrotreater after 7 years of operation, during which time the sample had accumulated 800 p.p.m. lead, 45 p.p.m. arsenic, and 525 p.p.m. iron.) After flushing with a nitrogen stream, hydrogen flow was begun and the sample was heated to 371° C. and this temperature was maintained for about 1 hour. The catalyst was reacted with thiophene in an HDS microreactor. In a comparative example, a portion of the same aged catalyst was treated with 95% $H_2$/5% $H_2S$ rather than solid sulfur at a temperature of 371° C. for about 1 hour. The results of these experiments appear in Table III.

TABLE III

Performance of Catalyst Treated with Solid Sulfur Compared with Use of the Same Catalyst Treated with $H_2$/$H_2S$ in the Reaction of Thiophene at 371° C. Ambient Pressure

| Example | LHSV, $hr^{-1}$ = 0.25 | LHSV, $hr^{-1}$ = 0.50 | LHSV, $hr^{-1}$ = 1.0 |
|---|---|---|---|
| Comp. C | 59.0 | 43.0 | 34.4 |
| 3 | 77.2 | 56.5 | 42.1 |

Comparative Example D and Example 4—Comparison of Pyrophoric Nature of Sulfided Catalyst and Non-Pyrophoric Nature of Catalyst containing Solid Sulfur in its Pores Comparative Example D A 34.5 g. sample of a conventional nickel molybdate hydrotreating catalyst was placed in a tube and topped with a layer of 5.52 g. of powdered sulfur. A thermocouple was inserted approximately in the middle of the catalyst bed. After purging with a nitrogen stream, hydrogen flow was begun and the temperature was raised to 371° C. and maintained at this temperature for about 2 hours. The system was purged again with a nitrogen stream and cooled to room temperature overnight. The catalyst sample was then subjected to an air stream and the temperature rise was measured as a function of time.

EXAMPLE 4

In accordance with the invention, a catalyst sample was prepared by placing 34.5 g. of the same catalyst described in Comparative Example D in a tube and topping said catalyst charge with 17.25 g. of powdered sulfur, which is the quantity sufficient to completely fill the pores of the catalyst assuming a pore volume of 0.5 cm$^3$/g. After purging with a nitrogen stream, the temperature was raised to 130° C. and maintained at this temperature under nitrogen flow for about 2 hours, during which time the molten sulfur was incorporated in the catalyst pores. The sample was cooled to room temperature overnight. The sample was then subjected to an air stream and the temperature was measured as a function of time by use of a thermocouple placed in the center of the catalyst bed.

The experimental results using catalysts prepared in Example 4 and Comparative Example D appear in Table IV.

TABLE IV

Exothermic Reaction Using Catalyst Prepared in Accordance with the Art Compared with Use of a Catalyst Prepared in Accordance with the Invention

| Example | Catalyst Bed Temp., °C. | Time After Air Contact, Min. |
|---|---|---|
| Comp. D | 22.5 | 0 |
| " | 30.0 | 1 |
| " | 38.0 | 2 |
| " | 38.0 | about 3.75 min. |
| " | 34.0 | 7 |
| " | 30.5 | 11 |
| " | 28.0 | 16 |
| Ex. 4 | 20.5 | 0 |
| " | 20.5 | 2 |
| " | 20.5 | 5 |
| " | 20.5 | 10 |
| " | 20.5 | 20 |
| " | 20.5 | 30 |

DESCRIPTION OF THE DRAWING

It is readily apparent from the FIGURE that the catalyst prepared in accordance with the invention containing solid sulfur within its pore structure is non-pyrophoric in nature in that the temperature of the catalyst is constant over a 30 minute period immediately after air contact. By sharp contrast, use of the catalyst prepared in accordance with the art results in a highly exothermic reaction as indicated by the sharp increase in temperature within a 2 minute period.

The present invention provides a process for treating a catalyst with elemental sulfur and hydrogen. Preferably the sulfur is incorporated in the pores of the top 10%–50%, preferably 10%–30%, of the catalyst bed. The process is a rapid, safe and reproducible means of presulfiding catalysts. Sulfur, as a presulfiding agent, is efficient, economical, readily available in refinery streams, and is low in toxicity and flammability. The use of expensive organic sulfides and solvents are eliminated.

EXAMPLE 5

The process of the present invention may be applied on a larger scale as follows:

A conventional vacuum gas oil hydrotreater, which contains catalyst in two beds (75% in the bottom bed, 25% in the top bed), is charged with fresh catalyst. The bottom bed is loaded to a depth of 30 ft. with catalyst in its oxide form, topped by a 3¾ ft. layer of the same catalyst, except the pores of the catalyst are filled with solidified elemental sulfur. The top bed is charged to a depth of 9 ft. with catalyst in the oxide state, followed by 1¾ ft. of the same catalyst containing solid sulfur in its pores. Following a nitrogen purge, hydrogen is passed through the reactor and the temperature is brought to a temperature of about 371° C. A sudden increase in hydrogen flow rate at the bottom of the reactor indicates the point at which presulfiding is almost complete. Hydrogen flow is continued after this "breakthrough" and observed, at which point the unit is pressurized and the feed is introduced. The time period allowed is determined by the catalyst composition of reactor volume.

After 2 years of operation, the catalyst is regenerated. The top 3¾ ft. section of the bottom bed is removed and replaced with fresh catalyst containing solid sulfur in its pores. The top 3 ft. of the upper bed is removed and replaced by 1¾ ft. of catalyst in the oxide formed topped by 1¼ ft. of catalyst containing elemental sulfur in the pores. The unit is started up in the same manner described above.

In the process described above, it is assumed that the pore volume of the catalyst is 0.5 cm$^3$/g. and that the catalyst has a catalyst of 3 weight % CoO or NiO and 15 weight % MoO$_3$ on an Al$_2$O$_3$ support. A stoichiometric amount of sulfur is employed, therefore no sulfur or sulfur-containing compound should exit the reactor except for small amounts of H$_2$S at the end of the sulfiding step.

We claim:

1. In a process of hydrotreating a hydrocarbon feed stock, which contains compounds with carbon-sulfur bonds, carbon-nitrogen bonds, and carbon-oxygen bonds, by contacting the hydrocarbon feed stock with hydrogen at an elevated temperature and with a hydrotreating catalyst to remove sulfur, nitrogen and oxygen from the hydrocarbon feed stock the improvement comprising using as at least part of a sulfided catalyst, a supported metal oxide catalyst, wherein said supported metal oxide catalyst is presulfided by the step of:
    contacting said supported metal oxide catalyst with elemental sulfur in the absence of hydrogen in such a manner that said elemental sulfur is at least partially incorporated in the pores of said catalyst.

2. The process of claim 1 wherein said catalyst is contacted with a stoichiometric amount of elemental sulfur based upon the metal content of the catalyst.

3. The process of claim 1 wherein said catalyst is contacted with powdered element sulfur.

4. In a process of hydrotreating a hydrocarbon feed stock, which contains compounds with carbon-sulfur bonds, carbon-nitrogen bonds, and carbon-oxygen bonds, by contacting the hydrocarbon feed stock with hydrogen at an elevated temperature and with a hydrotreating catalyst to remove sulfur, nitrogen and oxygen from the hydrocarbon feed stock the improvement comprising using as at least part of a sulfided catalyst, a supported metal oxide catalyst, wherein said supported metal oxide catalyst is presulfided by the steps of:

(a) contacting said supported metal oxide catalyst with molten elemental sulfur in the absence of hydrogen in such a manner that said molten elemental sulfur is at least partially incorporated in the pores of said catalyst, (b) cooling said catalyst, which has molten elemental sulfur at least partially incorporated within the pores, to allow the sulfur to solidify within the pores of said catalyst.

5. The process of claim 4 wherein supported metal oxide catalyst is contacted with molten sulfur at a temperature of 100°–150° C.

6. The process of claim 1 wherein the supported metal oxide catalyst contains at least one element selected from the group consisting of V, Cr, Mn, Fe, Co, Ni, Cu, Zn, Mo, W, Rh, Pd, Pt, Ag, An, Cd, Al, Sn, Sb, Bi and Te.

* * * * *

REEXAMINATION CERTIFICATE (2285th)
United States Patent [19]
Herrington et al.

[11] B1 4,177,136
[45] Certificate Issued May 3, 1994

[54] HYDROTREATING PROCESS UTILIZING ELEMENTAL SULFUR FOR PRESULFIDING THE CATALYST

[75] Inventors: Daniel R. Herrington, Chesterland; Albert P. Schwerko, Solon, both of Ohio

[73] Assignee: The Standard Oil Company, Cleveland, Ohio

Reexamination Request:
No. 90/002,798, Jul. 24, 1992

Reexamination Certificate for:
Patent No.: 4,177,136
Issued: Dec. 4, 1979
Appl. No.: 905,322
Filed: May 12, 1978

Related U.S. Application Data

[62] Division of Ser. No. 866,208, Jan. 3, 1978.

[51] Int. Cl.$^5$ .......................................... C10G 45/04

[52] U.S. Cl. .................. 208/215; 208/216 R; 208/216 PP; 208/217; 208/254 H
[58] Field of Search ............ 208/215, 216 R, 216 PP, 208/217, 254 H; 502/216

[56] References Cited

U.S. PATENT DOCUMENTS 2,038,599  4/1936  Pier et al. ............................. 252/439
2,905,625  9/1959  Berger ............................. 208/254 H

FOREIGN PATENT DOCUMENTS 759938  5/1967  Canada .

*Primary Examiner*—Helane E. Myers

[57] ABSTRACT

The present invention relates to an improved method of catalyst presulfiding, wherein the catalyst is treated with elemental sulfur. The use of elemental sulfur as a catalyst presulfiding agent is a means of rapidly and reproducibly attaining a highly active catalyst.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6 are cancelled.

\* \* \* \* \*